United States Patent [19]

Seguin

[11] 4,243,445

[45] Jan. 6, 1981

[54] METHOD FOR MAKING A REMOTE CONTROL CABLE

[75] Inventor: Pierre Seguin, Pont-de-Cheruy, France

[73] Assignee: Chavanoz SA, Chavanoz, France

[21] Appl. No.: 922,548

[22] Filed: Jul. 7, 1978

Related U.S. Application Data

[62] Division of Ser. No. 769,338, Feb. 16, 1977, Pat. No. 4,135,056.

[30] Foreign Application Priority Data

Feb. 16, 1976 [FR] France ................................ 76 04378

[51] Int. Cl.[2] ........................ H01B 13/06; B29F 3/10; H01B 7/00

[52] U.S. Cl. ........................................ 156/55; 156/56; 427/117; 427/358; 264/174; 427/434.4; 427/434.6; 427/434.7

[58] Field of Search ............... 427/117, 434 B, 434 D, 427/434 E, 358; 156/48, 51, 55, 56; 174/113 R, 113 C, 115, 117 F; 264/174

[56] References Cited

U.S. PATENT DOCUMENTS

| | | | |
|---|---|---|---|
| 382,768 | 5/1888 | Patterson | 156/48 |
| 1,940,917 | 12/1933 | Okazaki | 174/113 C |
| 2,081,634 | 5/1937 | McNamee | 174/115 |
| 2,292,394 | 8/1942 | O'Brien | 174/117 F |
| 2,948,020 | 11/1953 | D'Ascoli | 156/51 |
| 3,536,548 | 8/1968 | Chilcote | 264/25 |
| 3,607,487 | 9/1971 | Biskeborn | 156/48 |
| 3,889,455 | 6/1975 | Portinari et al. | 156/48 |
| 4,129,466 | 12/1978 | Portinari et al. | 156/48 |
| 4,135,056 | 1/1979 | Sequin | 174/117 F |

FOREIGN PATENT DOCUMENTS

| | | | |
|---|---|---|---|
| 480688 | 10/1951 | Italy | 174/113 C |

*Primary Examiner*—Sam Silverberg
*Assistant Examiner*—Richard Bueker
*Attorney, Agent, or Firm*—Sherman & Shalloway

[57] ABSTRACT

A remote control cable comprises two conducting wires separated by a central element with reinforcing wires parallel to the conducting wires. At least one layer of lapping covers these elements and at least one external coating layer is applied. The central element separates and holds the conducting wires parallel and is in the form of a continuous element, comprising two longitudinal recesses arranged symmetrically relative to a solid central portion. Each recess encloses a conductor over more than half of the periphery of the conductor. This cable may be used for the transmission of control command for moving bodies traveling at high speed.

1 Claim, 4 Drawing Figures

METHOD FOR MAKING A REMOTE CONTROL CABLE

This is a division of application Ser. No. 769,338, filed Feb. 16, 1977, now U.S. Pat. No. 4,135,056.

BACKGROUND OF THE INVENTION

1. Field of the Invention

The present invention relates to a new remote control cable or wire, which is light, of small section, with high tensile strength, virtually inextensible, flexible and impervious, which can advantageously be used for the transmission of control commands for moving bodies traveling at high speed.

More particularly, it relates to a new remote control cable intended to guide a moving body by means of commands which are in the form of rectangular electrical signals, a specific length of the cable being stored at the rear of the moving body and unwinding as the body moves.

The invention also relates to a new process and a new device for making such a cable.

2. Technical Considerations and Prior Art

Numerous documents describe conducting wires or conducting cables which can be used to transmit commands to a moving body. Amongst these documents are French Pat. No. 1,477,500 and its two Patents of Addition Nos. 90,970 and 93,154.

French Pat. No. 1,477,500 describes an inextensible conducting cable comprising a core containing at least two separate conductors situated virtually along the longitudinal axis of the said cable, the core being surrounded by a layer of lapping and the assembly covered by at least one thin coating layer.

According to Addition No. 90,970, in order to hold the conductors apart, the conducts are arranged symmetrically relative to a bonded glass fibre core and bonded to the latter by heat sealing. Other reinforcing glass fibres are arranged parallel to the core/conductor assembly and, as in the principal patent, the whole structure is surrounded by a lapping wire and an external coating. Preferably, the conducting wires are slightly inlaid inside the central core.

Addition No. 93,154 relates to improvements to the conducting cables produced according to the processes mentioned above, these improvements applying principally to, on the one hand, the nature and the method of lapping and, on the other hand, to the external coating of the said cable.

The conducting cables described in the aforementioned documents exhibit very high qualities, particularly with respect to their fineness, their strength and, above all, with respect to their electrical properties and particularly to their time constant factor.

However, the symmetrical positioning of the conducting wires relative to the core is rather difficult to achieve and, during manufacture and/or use, the wires can move slightly, which is prejudicial to good transmission of signals. Moreover, the use of glass fibres, as a separating element and as the core, increases the weight of the cable substantially, which leads to a reduction in the breaking coefficient of the cable determined by the ratio of the breaking strength of the cable to the weight of the cable.

To overcome these disadvantages, it has been proposed, particularly in French Pat. No. 2,005,693, to hold and to separate the conducting wires of a cable of the type previously described by assembling them in parallel by bonding them with the same lacquer as that used to insulate each of the wires. If, in theory, such a solution is attractive, it must be recognized that, from the practical point of view, it is difficult to achieve and that it suffers from a certain number of disadvantages. Indeed with this method, it is virtually impossible to have a good bond between the two conductors along their whole length, since the bonding takes place over a very small part of the surface of each of the conductors. Moreover, this bonding is rather poor and the conductors may have a tendency to separate from one another in use. Finally, the spacing between the two conductors is provided by the thickness of the insulating layer which surrounds each conductor, which therefore requires the conductors to be covered with a relatively thick layer of insulating material if sufficient spacing between them is to be achieved.

The prior art further includes the following patents: German Pat. No. 1,540,626, filed Dec. 23, 1965 (Ser. No. 101,140); German Pat. No. 1,665,605, filed Apr. 14, 1966 (Ser. No. 103,167); French Pat. No. 1,564,336 (based on U.S. Pat. Application Ser. No. 640,621), filed May 23, 1967; and U.S. Pat. No. 3,536,548, filed Aug. 26, 1968 (Ser. No. 755,296).

SUMMARY OF THE INVENTION

The present invention achieves an inextensible conducting cable which exhibits improved characteristics relative to the previous cables, particularly with respect to the spacing and holding of the conducting wires set in its central part.

Another advantage of the cable according to the present invention resides in the fact that the volume occupied by the conducting wires in the cable is reduced to a minimum whilst retaining a spacing for the conducting wires, which is suitable for good electrical characteristics.

The invention relates, therefore, to a remote control cable comprising two conducting wires separated by a central element, reinforcing wires parallel to the said conductors, at least one layer of lapping which covers these elements and at least one external coating layer. The invention is further characterized in that the central element separates and holds the conducting wires parallel and is in the form of a continuous element comprising two longitudinal recesses arranged symmetrically relative to a solid central portion. Each recess encloses a conductor over more than half of its periphery and the external surface of the separating element forms, with each of the free surfaces of each of the conductors, a continuous surface of generally elliptical cross-sectional shape.

Preferably, the central element for separating and holding the conducting wires surrounds the latter over two-thirds of their periphery, the distance between the two conductors being between 0.03 and 0.06 mm.

Advantageously, the material forming the central element is a heat-fusible, homogeneous material having a low dielectric constant, and is, for example, made up of a mixture of waxes, paraffins and low molecular weight polyethylene. As materials which give good results, there can be cited synthetic resins or waxes based on linear hydrocarbons, such as those marketed by EASTMAN KODAK, under the trademark "EPOLENE".

The conducting wires are preferably enamelled copper wires. The reinforcing wires which are placed parallel to the core are preferably in the form of a bundle of parallel wires, arranged concentrically around the core so that the latter is perfectly enclosed. The choice of reinforcing wires will depend on the mechanical characteristics required, but it is obvious that wires which have the greatest strength in decitex should be used.

Currently, as wires which are particularly suitable, there can be cited those known under the generic name of "ARAMID", which are based on an aromatic polyamide.

The lapping and the external coating are carried out in a known manner, the lapping comprising, advantageously, two superimposed layers wound in opposite directions.

According to a particular embodiment, the assembly made up of the core and the reinforcing parallel wires is surrounded by a loose lapping, which allows a quasi-circular section to be obtained and facilitates the penetration of a possible binding agent. The two external layers of lapping in opposite directions are made up of turns laid edge-to-edge around the complex thus formed, and the whole is covered with an external coating layer, preferably according to the same principle as that described in French Patent of Addition No. 93,154.

Moreover, it is advantageous to make the lapping layers using multi-filament, zero twist wires, which allows very good covering of the assembly, for a minimum thickness since the filaments lie virtually flat when lapped.

The invention also relates to a process and a device which make is possible to produce such a cable.

The process according to the invention consists of passing the conducting wires into a bath of molten material, based on an insulating product having a low dielectric constant, then gauging the coated wires by passing them through a die of specific section, and it is characterized in that the conducting wires are held apart in the bath of molten material and are led horizontally to the gauging die whilst being held in contact with the walls of the said die. In this way, the fusible material holds the conductors separated by a rigidly fixed distance and, moreover, surrounds the conductors on only one part of their periphery.

Advantageously, the conducting wires are led into the bath at a distance from one another, and converge near the gauging die where they are maintained at the desired spacing. The cable is then made by conventional means, by covering the core thus formed with a bundle of parallel reinforcing wires, providing the lapping and coating layers, and carrying out other appropriate treatments.

To carry out the invention, advantageously a particular coating and gauging device is used, in the form of a tank containing the fusible material into which the conducting wires are led and held separate by means of guides, the tank being equipped with a horizontal gauging die and including positioning guides which allow the wires to converge near the die whilst maintaining them in the horizontal plane containing the axis of the die. Advantageously, the circular gauging part of the die is preceded by a convergent section which facilitates the passage of the wires, and the level of the fusible material is above the die.

BRIEF DESCRIPTION OF THE DRAWINGS

The invention will be better understood by means of the example given below and which is illustrated by the appended figures.

DETAILED DESCRIPTION

Figure 1:
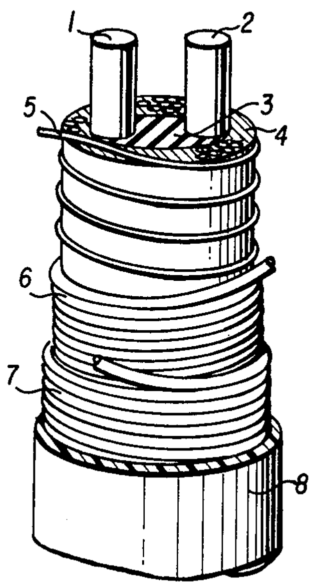
FIG. 1 shows in perspective a cable conforming to the invention.

As can be seen in FIG. 1, the cable according to the invention comprises two conducting wires 1 and 2, separated by a central element 3, parallel reinforcing wires 4, a loose lapping 5, covered by two alternate layers of lapping 6 and 7 wound in opposite directions and preferably made from multi-filament, zero twist wires. This structure is coated by at least one external coating layer 8.

Figure 2:
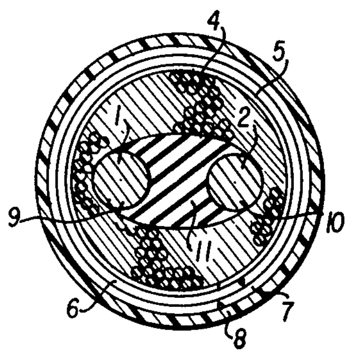
FIG. 2 is a transverse section of the cable.

In accordance with the invention, and as can be better seen in FIG. 2, the central element 3 for separating and holding the conducting wires 1 and 2 is in the form of a continuous element comprising two longitudinal recesses 9 and 10, arranged symmetrically relative to a central solid portion 11. Each recess 9 and 10 encloses a conductor 1 or 2 over more than half of the periphery of the conductor. This conductor/center element assembly forms a complex with a continuous surface of generally elliptical cross-sectional shape.

Thanks to this particular structure, there is obtained, on one hand, a good holding and a constant spacing of the conductors for the smallest possible volume occupied in the cable and, on the other hand, a minimum line capacity between conductors arising from the heat-fusible product used.

Figure 3:
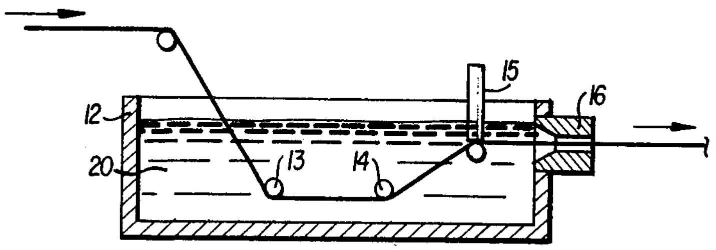
FIGS. 3 and 4 illustrate a side view and a top view, respectively, of the apparatus which makes it possible to produce the core of the cable according to the invention.
Figure 4:
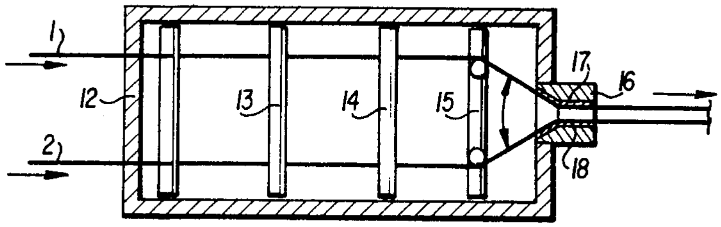

The manufacture of the core of a cable according to the invention is illustrated by FIGS. 3 and 4, wherein the two conducting wires 1 and 2 are led into a tank 12 containing a molten material 20 based on an insulating product. Guides 13, 14 and 15 allow the wires to be held spaced apart in the bath 20 and to be led to a horizontal, gauging die 16 in such a way that they converge near this die whilst being held in a horizontal plane containing the axis of the die. The conducting wires rub against the lateral walls 17 and 18 of the said die 16 as they pass therethrough.

The example which follows shows the advantages introduced by the invention.

EXAMPLE

In accordance with the invention, a cable as illustrated by FIGS. 1 and 2 is made. This cable has the following structure:

A core constituted by two copper, enamelled wires 1 and 2 of 0.07 millimeter diameter, and by a separating and holding element 3, the assembly having an elliptical shape whose dimensions are 0.22 mm long and 0.15 mm wide, a reinforcement 4 made from 4 aromatic polyamide yarns of 220 dtex/134 strands, a loose lapping 5 made from a polyester yarn of 50 dtex/22 strands, two lappings 6 and 7 laid edge-to-edge in opposite directions, made from polyester of 72 dtex/33 strands, and a final heat-sealing coating 8.

In the present instance, after forming the loose lapping 5, a coating is made using an acrylic resin in order to give cohesion to the reinforcing strands 4. Moreover, the final heat-sealing coating is made from a copolymer of vinyl chloride and vinyl propionate dissolved in ethyl acetate, the coating being controlled by gauging with a die. Finally, the lapping layers are made by conventional means with any appropriate material. The wire thus obtained exhibits the following characteristics:

final diameter: 0.46 mm weight: 260 g/km tensile breaking strength: 18 da N, which gives a breaking coefficient of:

R/P=69,000 m.

The electrical characteristics are:

resistance per conductor: 4.7 ohms/m capacity: 60 pF/m.

With such a cable, it is possible to control a moving body traveling at a speed close to 330 meters per second and to do so over a distance which can exceed 4,000 meters.

I claim:

1. A process for the manufacture of a remote control cable having two conducting wires separated and held by an insulating central element, reinforcing wires parallel to the said conductors, at least one layer of lapping covering these elements and at least one external coating layer, said process comprising the steps of:

passing the conducting wires into a bath of molten material of an insulating product having a low dielectric constant; gauging the coated wires by passing them through a die of elliptical cross section by leading the wires horizontally to the gauging die and holding the wires in contact with the walls of the said die with the portion of the wires in contact with the walls of the die being less than half of the peripheral surface of the wires; wherein the conducting wires are led into the bath spaced at a distance from one another and converged toward one another adjacent the gauging die; wherein the conducting wires are maintained at the desired spacing from one another within said die to form a central dielectric element comprising two longitudinal recesses arranged symmetrically relative to a central solid portion, each recess enclosing a conductor over more than half of its periphery, the remainder of the periphery forming a free surface, the external surface of the central dielectric element forming with each of the free surfaces of each of the conductors a central element having a continuous surface of generally elliptical cross-section shape, covering the central element thus formed with a bundle of parallel reinforcing yarns such that the reinforcing yarns enclose the continuous surface of said central element, said continuous surface of the central element including the surface of the insulated central dielectric element and less than half of the peripheral surface of the wires, and then providing lapping and coating layers on said covered central element.

* * * * *